United States Patent
Stone

[15] 3,664,017
[45] May 23, 1972

[54] METHOD OF FASTENING COIL LEADS

[72] Inventor: Thomas W. Stone, Owosso, Mich.

[73] Assignee: The Singer Company, New York, N.Y.

[22] Filed: Feb. 27, 1970

[21] Appl. No.: 18,396

Related U.S. Application Data

[62] Division of Ser. No. 723,152, Apr. 22, 1968, Pat. No. 3,519,860.

[52] U.S. Cl. ............................29/596, 29/605, 310/42, 310/71, 310/269, 336/192
[51] Int. Cl. .................................................H02k 15/00
[58] Field of Search .............29/596, 597, 598, 605; 310/71, 310/269, 42, 234; 242/1.1 A, 1.1 E, 1.1 R; 336/192

[56] References Cited

UNITED STATES PATENTS

| | | | |
|---|---|---|---|
| 1,722,362 | 7/1929 | Wiley | 336/192 X |
| 3,015,744 | 1/1962 | Wesolowski | 29/597 X |
| 2,872,599 | 2/1959 | De Young | 310/71 |
| 2,904,269 | 9/1959 | Eminger | 29/605 UX |

Primary Examiner—John F. Campbell
Assistant Examiner—Carl E. Hall
Attorney—John W. Michael, Gerrit D. Foster, Bayard H. Michael, Paul R. Puerner, Joseph A. Gemignani, Andrew O. Riteris and Spencer B. Michael

[57] ABSTRACT

Coil leads are positioned in the corners of the coil slots formed at the juncture of the inner coil slot walls and the poles. The coils are wound in place on the poles over the lead wires securely anchoring the lead wires in the corners. The coil ends are connected to the lead wires.

6 Claims, 2 Drawing Figures

Patented May 23, 1972

3,664,017

METHOD OF FASTENING COIL LEADS

This is a division of application Ser. No. 723,152, filed Apr. 22, 1968, U.S. Pat. No. 3,519,860 entitled "METHOD OF FASTENING COIL LEADS AND DYNAMOELECTRIC MACHINE RESULTING THEREFROM."

BACKGROUND OF INVENTION

1. Field of Invention

This invention relates to dynamoelectric machines and, more particularly, to a method of attachment of coil end lead wires in such machines and also to the machine resulting from that method.

2. Description of Prior Art

Common practice is to provide some form of termination for the coil ends in an electric motor, or dynamoelectric machinery in general. Most commonly, lead wires are attached to the coil ends and the lead wires are then connected, for example, to the stator core to securely anchor the lead wires. The connection is also made in a manner to obtain necessary strain relief. Heretofore accepted practices of fastening the lead wires and in a manner to obtain strain relief, have usually required additional elements such as lacing cord, tape, tubes or wedges in the coil slots, etc. These prior practices are not readily adapted to automated procedures and are costly as requiring considerable hand labor in the lead attachment for strain relief as well as in attaching the coil ends to the lead wire and, furthermore, in requiring the aforementioned additional elements. Also, additional elements, such as the wedges, tubes, etc., obstruct the coil slot openings and interfere with air flow where such flow is desired.

SUMMARY OF INVENTION

An object of this invention is to provide a generally simplified method of securely fastening coil leads which is especially adapted to automated procedures, does not require any additional structural elements, and achieves optimum strain relief.

To achieve this and other objects, this invention proposes to fasten coil leads in a core of a dynamoelectric machine by positioning the leads adjacent one of the core poles and assembling the coils onto the poles in such a manner that the leads are entrapped by the coils in an assembly including the core, coils and leads.

DESCRIPTION OF PREFERRED EMBODIMENT

Figure 1:
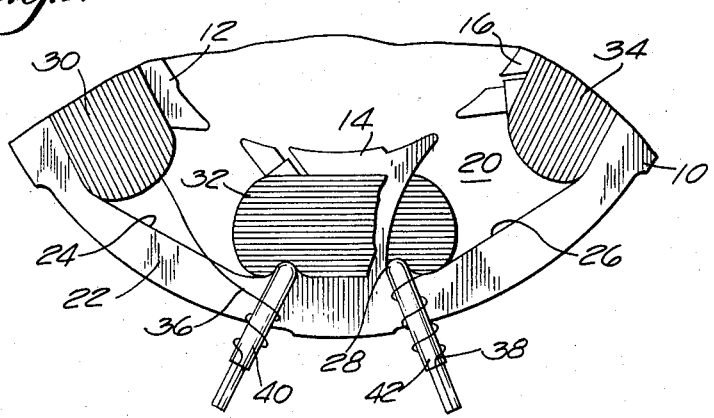
FIG. 1 is an end view of a portion of a motor stator illustrating the relationship between the leads and coils in the stator.
Figure 2:
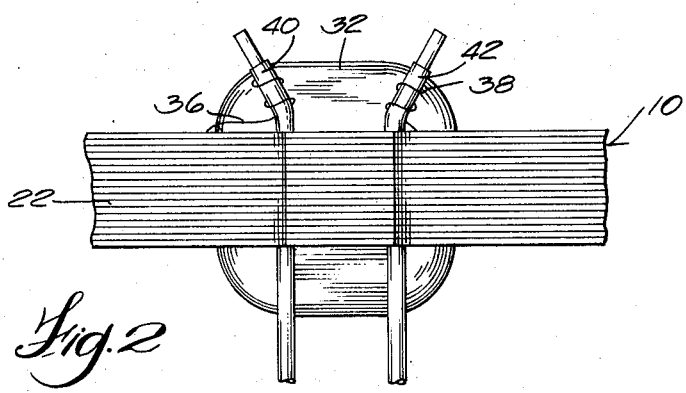
FIG. 2 is a bottom plan view of the stator portion of FIG. 1.

With particular reference to the drawing, the invention is illustrated in connection with a stator for an electric motor, in this case a shaded pole motor.

The stator core 10 is constructed of a number of stacked laminations as is conventional practice. The assembled core includes a plurality of poles only three of which, 12, 14 and 16, are shown. The poles are angularly spaced with respect to each other and slot openings are formed between adjacent poles, for example, slot openings 18 and 20 in FIG. 1. The stator core includes an outer continuous ring portion 22 from which poles 12, 14 and 16 project. The ring portion defines inner slot walls 24 and 26 between adjacent poles 12, 14 and 14, 16. Corners are provided in the slot openings at the juncture between the inner slot walls 24, 26 and poles 12, 14 and 16. The corners are identical at each of the poles and one such corner 28 is illustrated in connection with pole 14 in FIG. 1.

The general practice is to wind coils on the poles, in the drawings coils 30, 32 and 34 are shown as having been wound on poles 12, 14 and 16 respectively. Coil ends 36 and 38 are left after the winding operation and it is necessary to fasten these coil ends to a terminal member for connection to an external electrical source and in a manner to provide strain relief for the coil ends and the terminal connections. As stated above, the general practice is to provide lead wires which are generally heavier than the coil ends. The lead wires are electrically connected to the coil ends and the lead wires are then connected in the stator core. This invention proposes as a solution to this problem of fastening the coil ends to fasten, or entrap, the lead wires in a core assembly as the coils are assembled onto the poles.

As illustrated, lead wires 40, 42 are positioned in the corners formed at the juncture between inner slot walls 24 and 26 and pole 14. With the lead wires so positioned, the coils are wound on the poles. The coils engage and clamp the lead wires in the corners to securely anchor the lead wires in a core assembly including the laminated core, the coils and the lead wires. With this arrangement, the lead wires are positively held in engagement with the core, at this point it should be noted that the term "core" is used in a broad sense to encompass both the ring and pole portions as being a part of the core. Coil ends 36 and 38 are electrically connected to lead wires 40 and 42. With this arrangement, the lead wires are securely clamped to the stator core by means of a relatively simple technique, without requiring any additional elements and in a manner which provides the necessary strain relief.

The leads 40 and 42 project from both axial ends of the stator core to facilitate connection of the coil ends and also to expose the leads for convenient connection to an external terminal source.

Although but one embodiment of the present invention has been illustrated and described it will be apparent to those skilled in the art that various changes and modifications may be made therein without departing from the spirit of the invention or from the scope of the appended claims.

I claim:

1. The method of fastening leads in a dynamoelectric machine having a core including poles and comprising the steps of positioning more than one lead adjacent at least one of said poles, then assembling coils having ends unto said poles in engagement with said leads and entrapping and anchoring said leads in a core assembly including said core, coils, and leads, and then electrically connecting one of said leads to each of said coil ends.

2. The method of claim 1 wherein said leads are positioned in engagement with said core, and said coils are assembled to hold said leads against said core.

3. The method of claim 2 wherein said core includes coil slots between adjacent poles and having inner slot walls from which said poles project and including the steps of positioning said leads against said inner slot walls, and assembling said coils onto said poles in a manner to hold said leads against said inner slot walls.

4. The method of claim 3 wherein said leads are positioned in the corners formed at the juncture of at least one of said poles and said inner slot walls, and assembling said coils onto said one pole to hold said leads in said corners.

5. The method of claim 2 wherein said core includes coil slots between adjacent poles and having inner slot walls from which said poles project and including the steps of positioning said leads against said inner slot walls, and subsequent to positioning said leads winding said coils in place on said poles and to entrap said leads in said core assembly.

6. The method of claim 5 wherein said leads are positioned in the corners formed at the juncture of at least one of said poles and said inner slot walls, and assembling said coils onto said one pole to hold said leads in said corners.

* * * * *